(12) United States Patent
Samaras

(10) Patent No.: US 9,101,244 B2
(45) Date of Patent: Aug. 11, 2015

(54) MODULAR GRILL

(71) Applicant: George Samaras, Doraville, GA (US)

(72) Inventor: George Samaras, Doraville, GA (US)

(*) Notice: Subject to any disclaimer, the term of this patent is extended or adjusted under 35 U.S.C. 154(b) by 233 days.

(21) Appl. No.: 13/664,156

(22) Filed: Oct. 30, 2012

(65) Prior Publication Data
US 2014/0116265 A1 May 1, 2014

(51) Int. Cl.
*A47J 37/00* (2006.01)
*A47J 37/07* (2006.01)

(52) U.S. Cl.
CPC .......... *A47J 37/0704* (2013.01); *A47J 37/0763* (2013.01); *A47J 2037/0777* (2013.01)

(58) Field of Classification Search
CPC .................................................. A47J 37/0763
USPC ............ 99/340, 449, 450; 126/25 R, 9 R, 9 B
See application file for complete search history.

(56) References Cited

U.S. PATENT DOCUMENTS

| 967,447 | A | * | 8/1910 | Schmidt | 126/9 R |
|---|---|---|---|---|---|
| 1,296,144 | A | * | 3/1919 | Watson | 126/9 R |
| 2,026,387 | A | * | 12/1935 | Jackes et al. | 126/65 |
| 2,369,965 | A | | 2/1945 | Harris | |
| 4,645,225 | A | | 2/1987 | Eubanks | |
| 5,785,046 | A | | 7/1998 | Colla | |
| 6,189,528 | B1 | | 2/2001 | Oliver | |
| 6,681,759 | B2 | | 1/2004 | Bentulan | |
| 7,426,928 | B2 | | 9/2008 | Sanders et al. | |
| 2010/0148641 | A1 | * | 6/2010 | Ehmke | 312/100 |

* cited by examiner

*Primary Examiner* — Reginald L Alexander
(74) *Attorney, Agent, or Firm* — Baker Donelson; Dorian B. Kennedy

(57) ABSTRACT

A modular grill (10) includes a base (11) and a hood assembly (12) coupled to the base through a series of hinges (13). The base includes a multi-piece cooking grate (18) is coupled to the base. The base includes two oppositely disposed end pieces (21) and at least one mid-section piece (22). Each base piece is removably coupled to an adjacent piece of the base through a base mounting bracket (24). Similarly, the hood assembly includes two oppositely disposed end pieces (31) and at least one mid-section piece (32). Each segment or piece of the hood is removably coupled to an adjacent piece of the hood through a hood mounting bracket (35). One can change the overall size of the grill by changing the number of base and hood mid-section pieces utilized.

8 Claims, 3 Drawing Sheets

MODULAR GRILL

TECHNICAL FIELD

This invention relates generally to grills, and more particularly to grills which may be reconfigured to different sizes.

BACKGROUND OF THE INVENTION

Cooking grills have existed for many years. These cooking grills oftentimes include a hood which is able to cover a cooking grate. Typically, the hood is designed to pivot so that it may be moved between a closed position covering the cooking grate and an open position exposing the cooking grate.

A problem however may exist with regard to cooking different amounts of food at different times. A person may wish to cook a single item of food when dining alone, may wish to cook a few items when dining with a small family, or may wish to cook many items when cooking for a special event such as a party or cookout. In the past, this has created problems by forcing a person to select between a small grill to accommodate small numbers of items or a large grill to accommodate a large number of items. However, if the small grill is chosen that person will not be able to cook a large number of items at one time. Similarly, if the large grill is chosen that person will have to heat the entire grill area to cook a much smaller area of the grate upon with the small number of items is placed. To compensate for this problem some grills have multiple burners so that one can choose the number of burners to ignite depending on the number of items to be cooked. The selection of less than all burners however does not provide a consistent heat across the grate.

Accordingly, there is a need in the art for a grill that will allow different amounts of items to be cooked. It is to the provision of such therefore that the present invention is primarily directed.

SUMMARY OF THE INVENTION

In a preferred form of the invention a modular grill comprises a base housing having two end pieces and at least one mid-section piece, each end piece having a base floor and a base sidewall extending from the base floor. The base housing also has base mounting brackets coupling the base end pieces to the base mid-section piece or coupling the base end pieces to each other. The modular grill also includes a cooking grate coupled to the base housing and a hood assembly. The hood assembly includes a hood housing coupled to the base housing. The hood housing has two end pieces and at least one mid-section piece, and hood mounting brackets coupling the hood end pieces to the hood mid-section piece or coupling the hood end pieces to each other. With this construction, the grill may be configured to different sizes according to the inclusion and number of base and hood housing mid-section pieces utilized.

DETAILED DESCRIPTION

Figure 1:
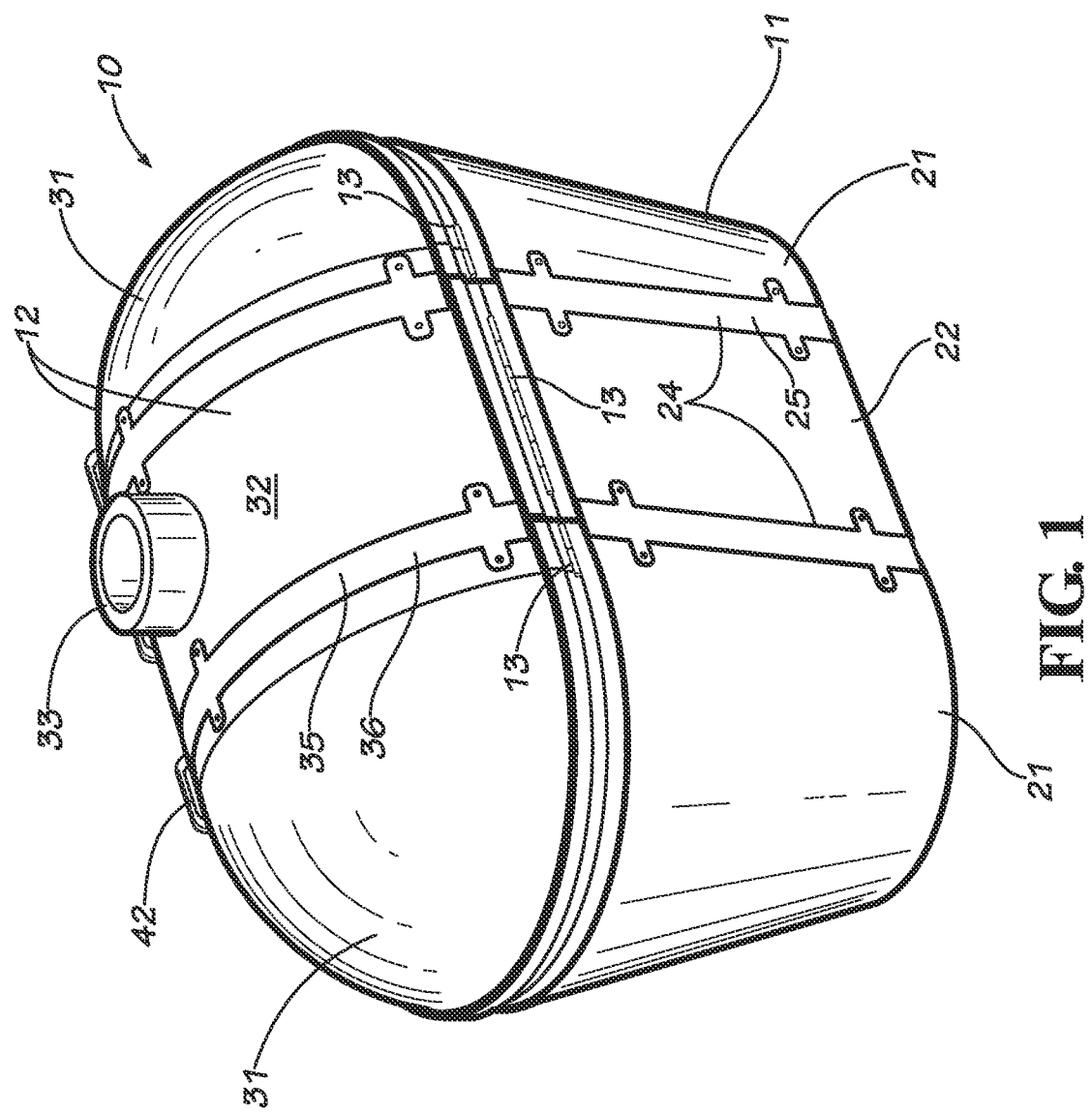
FIG. 1 is a perspective view of the modular grill embodying principles of the invention in a preferred.

With reference next to the drawings, there is shown a a modular grill 10 according to the present invention. The grill 10 includes a base or base assembly 11 and a hood or hood assembly 12 coupled to the base 11 through a series of hinges 13. The base and hood may be made of a ceramic material, a metal, a combination of such, or any other conventionally known grill material.

The base 11 includes a floor 15 and sidewalls 16 extending from the floor 15 to an open top defining a grate opening 17. Gas burners and related equipment are positioned within the housing in conventional fashion to produce heat beneath or adjacent to the grate opening 17. A multi-piece or expandable cooking grate or grate pieces 18 is coupled to the base in a position within or adjacent to the grate opening 17, so that food place upon the cooking grate 18 is cooked by the heat produced by the gas burners and related equipment. It should be understood that even though the description herein primarily refers to a gas burner, any alternative heat form may also be utilized, such as charcoal, electric heating elements, and other conventionally known heating means.

The base 11 includes two oppositely disposed end pieces 21 and at least one mid-section piece 22 positionable between the two end pieces 21 so that the plurality of longitudinally aligned series of pieces or segments 21 and 22 forms the complete base. Each base segment or piece 21 and 22 of the base is removably coupled to an adjacent piece 21 and 22 of the base through a base mounting bracket 24. Here, the base mounting bracket 24 is shown in the form of a metal beam, member or strap having an outer portion 25 and an inner portion 26 each having mounting holes 27, and mounting bolts 28 extending through the base strap mounting holes 27 and through a mutually aligning mounting hole 29 in the piece 21 and 22. The separation between the outer portion 25 and inner portion 26 defines a channel 30 therebetween sized and shaped to receive an edge portion of an adjacent piece 21 and 22. The outer portion and inner portion may be coupled to each other or, alternatively, be separate and distinct from each other. The bolt 28 may be threaded into a corresponding nut 31 or the oppositely disposed mounting hole 27 may include internal threads.

Similarly, the hood assembly 12 includes two oppositely disposed end pieces 31 and at least one mid-section piece 32 positionable between the two end pieces 31 so that the plurality of longitudinally aligned series of pieces or segments forms the complete hood. The mid-section piece 32 of the hood assembly includes a top vent 33 and a bottom opening 34. Each segment or piece 31 and 32 of the hood is removably coupled to an adjacent piece of the hood through a hood mounting bracket 35. Here, the hood mounting bracket 35 is shown in the form of an arcuate beam, member or strap having an outer portion 36 and an inner portion 37 each of which includes mounting holes 38, and mounting bolts 39 extending through the hood strap mounting holes 38 and through a mutually aligning mounting hole 40 in the piece 31 and 32. The outer portion and inner portion may be coupled to each other or, alternatively, be separate and distinct from each other. The bolt 39 may be threaded into a corresponding nut 41 or the oppositely disposed mounting hole 38 may include internal threads. Each hood piece 31 and 32 also includes a handle 42 which enables one to pivot the hood relative to the base through the hinges 13.

In use, the user may select the relative size of the grill according to the amount of items to be cooked at that particular time. If the user is cooking a small amount of items the user can utilize just the two end pieces 21 and 31 of the base and hood. The two base end pieces 21 are coupled to each other through mounting bracket 24. To accomplish this, the user simply abuts the two end pieces together so that the mounting holes 27 and 29 are mutually aligned and the mounting bolts 28 are passed through the mounting holes and threadably secured. The grate pieces 18 corresponding to the two end pieces are then mounted to the base. Simultaneously with the coupling of the base the user also assembles the hood assembly in the same manner utilizing the corresponding and hingedly coupled hood end pieces 31 and hood mounting bracket 35.

Alternatively, if the user is cooking a large amount of items the user can utilize the end pieces 21 and 31 of the base and hood together with one or more mid-section pieces 22 and 32 of the base and hood. Here, the base mid-section piece(s) 22 is sandwiched between two end pieces 21 and all the pieces are longitudinally secured to each other with the use of the mounting brackets 24 and 35, as previously described. The grate pieces 18 corresponding to the two end pieces and the mid-section piece(s) are then mounted to the base.

With the hood pieces 31 and 32 mounted together an operator may open all hood pieces simultaneously.

As such, it should be understood that the grill may be configured and subsequently reconfigured to different sizes in order to accommodate different amounts of items to be cooked. The correct size of the grill to the amount of food cooked ensures that all items receive similar quantities of heat, i.e., an even heat distribution across the grate.

Figure 2:
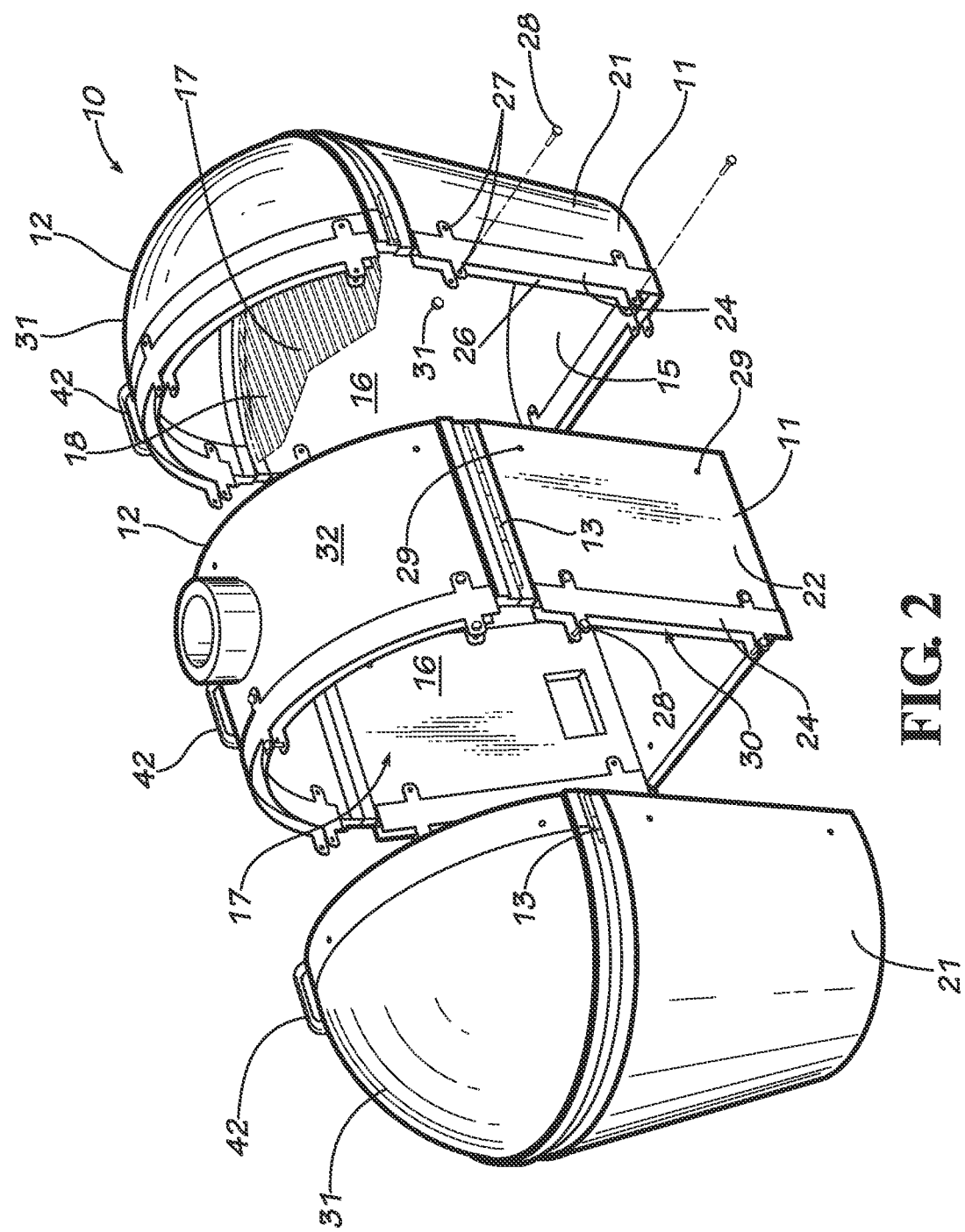
FIG. 2 is an exploded, perspective view of the grill of FIG. 1.
Figure 3:
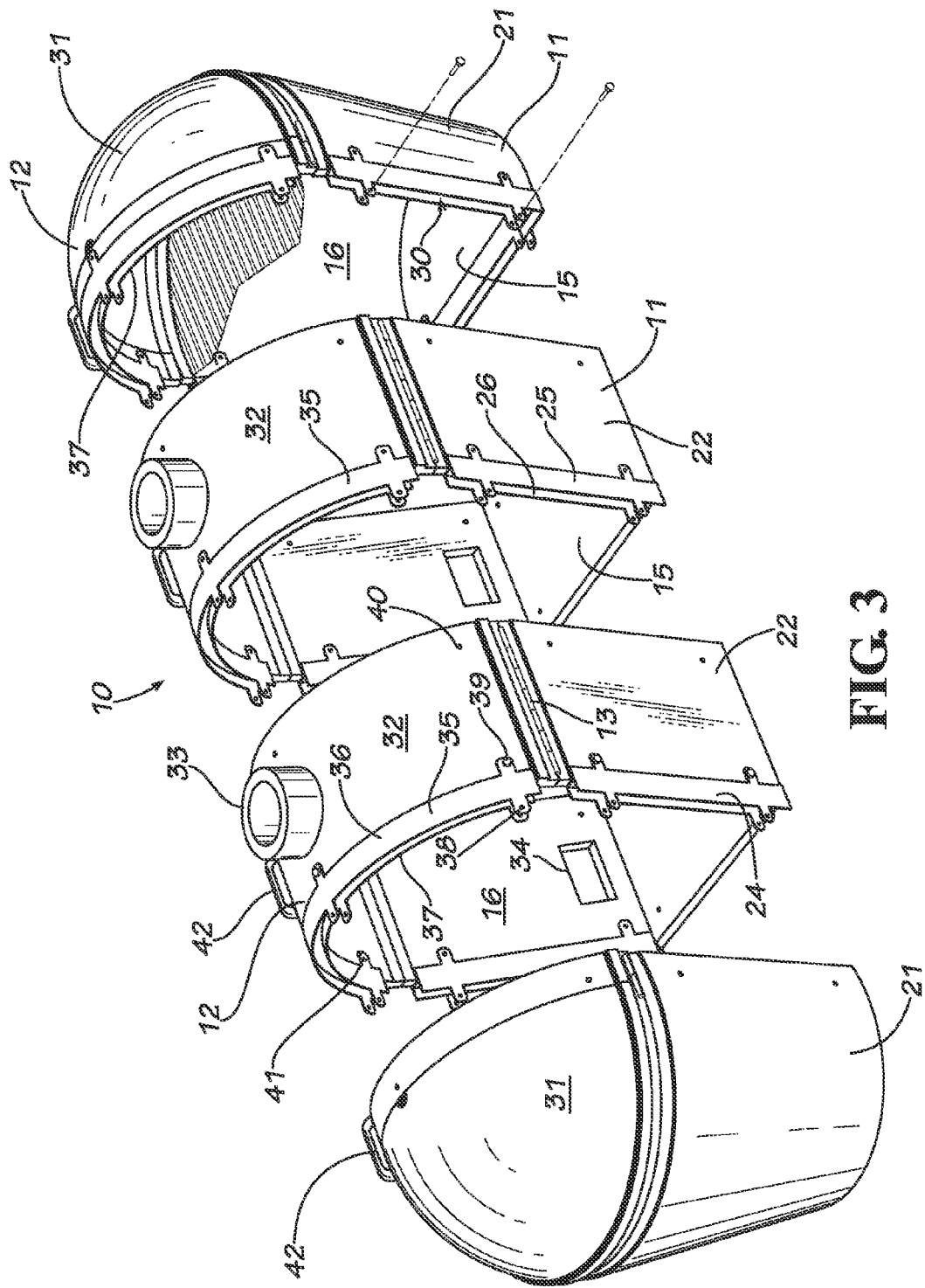
FIG. 3 is an exploded, perspective view of the modular grill of FIG. 1, shown with an additional mid-section segment.

It should be understood that the grill may be configured to have any relatively small number of mid-sections 22 and 32, and that it is not limited to the one mid-section embodiment of FIGS. 1 and 2 or the two mid-sections embodiment shown in FIG. 3.

It should also be understood that the end and mid-section pieces of the grill may be coupled to each other in any conventionally known fashion or with any known coupling means including but not limited to, tongue and groove type mating, brackets, perimetral straps, surrounding frames or the like.

Lastly, it should be understood that the hood end pieces may also include a vent or chimney.

While this invention has been described in detail with particular reference to the preferred embodiments thereof and the best mode of practicing same, it will be understood that variations and modifications can be effected within the spirit and scope of the invention as described herein above and as set forth in the appended claims.

The invention claimed is:

1. A modular grill comprising:
a base housing, said base housing having two end pieces and at least one mid-section piece, each said base housing end piece having a base housing end piece floor and a base housing end piece sidewall extending from said base housing end piece floor, said at least one base housing mid-section piece also having a base housing mid-section piece base floor and a base housing mid-section piece sidewall extending from said base housing mid-section piece floor, said base housing also having at least one base mounting bracket coupling said base housing end pieces to said base housing mid-section piece or coupling said base housing end pieces to each other;
a cooking grate coupled to said base housing, and
a hood assembly including a hood housing coupled to said base housing, said hood housing having two hood housing end pieces and at least one hood housing mid-section piece, said hood housing also having at least one hood mounting bracket coupling said hood housing end pieces to said hood housing mid-section piece or coupling said hood housing end pieces to each other,
whereby the modular grill may be configured to different sizes according to the inclusion and number of base housing mid-section pieces and hood housing mid-section pieces utilized.

2. The modular grill of claim 1 wherein said base mounting bracket include a channel therein configured to receive a portion of an adjacent base housing piece.

3. The modular grill of claim 1 wherein said base mounting bracket include two oppositely disposed channels therein configured to receive a portion of two adjacent base housing pieces.

4. The modular grill of claim 1 wherein said hood mounting bracket include a channel therein configured to receive a portion of an adjacent hood housing piece.

5. The modular grill of claim 1 wherein said hood mounting bracket include two oppositely disposed channels therein configured to receive a portion of two adjacent hood housing pieces.

6. The modular grill of claim 2 wherein said hood mounting bracket include a channel therein configured to receive a portion of an adjacent hood housing piece.

7. The modular grill of claim 3 wherein said hood mounting bracket include two oppositely disposed channels therein configured to receive a portion of two adjacent hood housing pieces.

8. The modular grill of claim 1 wherein said base housing and said hood assembly pieces are constructed of ceramic material.

* * * * *